United States Patent
Mandai et al.

(10) Patent No.: US 10,005,945 B2
(45) Date of Patent: Jun. 26, 2018

(54) DRILLING FLUID ADJUSTING AGENT AND DRILLING FLUID USING THE SAME

(71) Applicant: THE NIPPON SYNTHETIC CHEMICAL INDUSTRY CO., LTD., Osaka (JP)

(72) Inventors: Shusaku Mandai, Osaka (JP); Hiroki Takeda, Osaka (JP)

(73) Assignee: THE NIPPON SYNTHETIC CHEMICAL INDUSTRY CO.. LTD., Osaka (JP)

( * ) Notice: Subject to any disclaimer, the term of this patent is extended or adjusted under 35 U.S.C. 154(b) by 55 days.

(21) Appl. No.: 15/102,894

(22) PCT Filed: Dec. 26, 2014

(86) PCT No.: PCT/JP2014/084532
§ 371 (c)(1),
(2) Date: Jun. 9, 2016

(87) PCT Pub. No.: WO2015/099131
PCT Pub. Date: Jul. 2, 2015

(65) Prior Publication Data
US 2017/0037294 A1 Feb. 9, 2017

(30) Foreign Application Priority Data
Dec. 26, 2013 (JP) .................................. 2013-268867

(51) Int. Cl.
*C09K 8/24* (2006.01)
(52) U.S. Cl.
CPC ..................................... *C09K 8/24* (2013.01)
(58) Field of Classification Search
None
See application file for complete search history.

(56) References Cited

U.S. PATENT DOCUMENTS

| | | | | |
|---|---|---|---|---|
| 4,476,033 A | * | 10/1984 | Josephson | C09K 8/685 166/307 |
| 9,688,906 B2 | * | 6/2017 | Singh | C09K 8/685 |
| 2005/0189109 A1 | * | 9/2005 | Eagland | C09K 8/588 166/268 |
| 2006/0102351 A1 | * | 5/2006 | Crabtree | C09K 8/5083 166/295 |
| 2007/0114028 A1 | * | 5/2007 | Crabtree | C09K 8/68 166/280.1 |
| 2007/0129258 A1 | | 6/2007 | Patel et al. | |
| 2010/0261830 A1 | * | 10/2010 | Shibutani | C08J 5/18 524/503 |
| 2017/0150713 A1 | * | 6/2017 | Saka | A01N 25/04 |

FOREIGN PATENT DOCUMENTS

| | | |
|---|---|---|
| JP | H08-085710 A | 4/1996 |
| JP | 2011-057769 A | 3/2011 |

OTHER PUBLICATIONS

International Search Report issued with respect to Application No. PCT/JP2014/084532, dated Mar. 17, 2015.
International Preliminary Report on Patentability issued with respect to Application No. PCT/JP2014/084532, dated Jun. 28, 2016.

* cited by examiner

*Primary Examiner* — John J Figueroa
(74) *Attorney, Agent, or Firm* — Greenblum & Bernstein, P.L.C.

(57) ABSTRACT

A drilling fluid adjusting agent using a PVA-based resin capable of contributing to the reduction of hydration swelling of bentonite even in the presence of salts; and a drilling fluid using the same are provided. The drilling fluid adjusting agent contains a PVA containing 1,2-diol structural unit in a side chain thereof. The drilling fluid adjusting agent has excellent solubility even in the presence of salts such as potassium ion, and also has excellent reduction of hydration swelling of bentonite.

9 Claims, No Drawings

DRILLING FLUID ADJUSTING AGENT AND DRILLING FLUID USING THE SAME

TECHNICAL FIELD

The present invention relates to an adjusting agent added to a drilling fluid used for drilling the earth formation in foundation works of civil engineering works, drilling for oils and natural gases, or mining. The invention also relates to a drilling fluid containing the adjusting agent.

BACKGROUND ART

Drilling fluid is circulated through the wellbore while rotary drilling or when renovating old wellbores. The drilling fluid performs the following functions:
(1) Drilling fluid transports drill cuttings from the bottom hole to the surface;
(2) Drilling fluid prevents formation fluid from spouting by balancing pressure in the borehole;
(3) Drilling fluid forms a thin but tough filter cake of mud deposited on the borehole wall to minimize formation damage;
(4) Drilling fluid cools and lubricates drilling tools; and
(5) Drilling fluid keeps drill cuttings suspended in mud even when circulation flow of the drilling fluid is paused.

Drilling fluid is classified into water-based drilling fluid and oil-based drilling fluid. A typical drilling fluid is a drilling mud which contains an adjusting agent such as dispersing agent, weighting material, polymers, salts, lubricant and so on depending on the borehole condition, in addition to bentonite mud consisting mainly of water-bentonite suspension.

Bentonite contains clay mineral called montmorillonite as a main component, and other minerals such as feldspar and quartz. The bentonite increases the viscosity of drilling fluid to transport drill cuttings to the surface of the earth effectively. Also, bentonite is deposited on the borehole wall during drilling to make a mud wall free from formation damage. Since drilling mud pressure is usually controlled to be larger than stratum pressure in the borehole, clay mineral (bentonite) contained in the drilling mud flow in the borehole is allowed to enter into pores of the stratum and thereby mud filter cake is made on the surface of the borehole wall while drilling. Thus mud filter cake can minimize formation damage occurred in the drilling operation, and also reduce friction between a drill string and borehole wall.

However, drilling mud prepared by merely adding bentonite to water has drawbacks such as low collapse resistance, weak against salt or cement, or temperature instability. For these drawbacks, the employment of the drilling mud is limited for drilling shallow layer. In order that a drilling mud can perform functions (1) through (5) described above in drilling in greater depth or underground continuous wall building construction, various adjusting agents must be further added to the drilling mud.

Typical additives include salts such as potassium ion, and polymers such as acrylate-based polymer, carboxymethyl cellulose, polysaccharide, or polyvinyl alcohol (PVA).

Potassium ion, which is a cation adsorbed electrically to montmorillonite, is known for significantly reducing swelling of montmorillonite. In addition, it is known that the above-mentioned polymers can provide a drilling mud consisting of bentonite and water with resistance against cement contamination, and can act a dispersing agent for drilling mud, thereby inhibiting increase of drilling mud viscosity.

As the polyvinyl alcohol, carboxylic acid-modified TVA as an anion-modified PVA and sulphonic acid-modified PVA having a specific structure are disclosed in, for example, JP S57-23671A (patent document 1) and in JP H08-85710A (patent document 2) respectively. In addition, US2007/0129258 (patent document 3) teaches that use of cation-modified PVA with shale hydration inhibitor can prevent hydration swelling of shale clay and adjust rheological property of the drilling fluid.

However, such anion-modified PVA and cation-modified PVA have a functional group such as sulfonic acid group or ammonium salt, which may react other additives in the drilling fluid. When the reaction occurs, the modified PVAs will not perform their essential functions in the drilling fluid.

In view of avoiding the reaction between polyvinyl alcohol and other additive, nonionic TVA is likely to be preferably employed. As an example of nonionic PVA other than unmodified PVA used for drilling fluid, oxyalkylene-modified PVA is suggested in JP2011-57769A (patent document 4).

PRIOR ART

Patent Document

Patent document 1 JP S57-23671A
Patent document 2 JP H08-85710A
Patent document 3 US 2007/0129258
Patent document 4 JP 2011-57769A

SUMMARY OF THE INVENTION

Technical Problem to be Solved by the Invention

Since drilling fluid is usually prepared on drilling site, additive and adjusting agent need to have good solubility in water at normal temperature. In the case of unmodified PVA, partially saponified PVA having a saponification degree of about 80 to 90 mol % must be used because completely saponified PVA is hard to dissolve in water at normal temperature. KCl is generally added to the drilling fluid because of providing the drilling fluid with remarkable reduction of clays swelling. However, even partially saponified unmodified PVA tends to be lowered in water-solubility in the presence of salt. Therefore, PVA is required for maintaining excellent solubility even in the presence of salt such as potassium salt. If PVA has low solubility in salt water, a sufficient amount of the PVA is hard to be contained. Moreover, since seawater may be used as matrix for water-based drilling fluid, solubility for brines is important. For these reasons, excellent salt water solubility is required.

It is known that oxyalkylene-modified PVA having a higher saponification has lower water solubility at normal temperature although the oxyalkylene-modified PVA is still superior to unmodified PVA in the water solubility. As is the case with other PVAs, oxyalkylene-modified PVA is also required to satisfy water solubility in the presence of salt and brine solubility. Accordingly, the satisfactory solubility is needed without impairing swelling reduction property.

The present invention has been completed under these situations. The object is to provide a drilling fluid adjusting agent having improved swelling reduction as well as solubility in the presence of salts.

Means for Solving the Problems

The inventors have studied nonion-modified PVAs, which are low reactivity with other additives including salts. The inventors have found that its saponification degree influences not only water or brine solubility but also swelling reduction in the case of oxyalkylene-modified PVA. Partially saponified oxyalkylene-modified PVA can satisfy water and brine solubility but not swelling reduction. The inventors have studied other nonion-modified PVAs and arrived at the present invention. A drilling fluid adjusting agent of the invention comprises a (A) polyvinyl alcohol-based resin containing 1,2-diol structural unit with the general formula (1) shown below.

[formula 1]

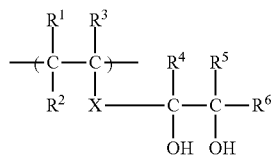
(1)

$R^1$ through $R^3$ each in the formula (1) is hydrogen atom or an alkyl group having from 1 to 5 carbon atoms independently, X is single bond or a binding chain, $R^4$ through $R^6$ each is hydrogen atom or an alkyl group having from 1 to 5 carbon atoms independently.

The drilling fluid of the present invention comprises liquid medium, bentonite-based compound, and drilling fluid adjusting agent of the invention. The liquid medium is preferably water-based medium.

Effect of the Invention

A drilling fluid adjusting agent of the invention can satisfy both swelling reduction and solubility. The solubility includes brine solubility as well as water solubility at normal temperature. Accordingly, a drilling fluid employing the drilling fluid adjusting agent of the invention can form thin but tough mud wall.

MODES FOR CARRYING OUT THE INVENTION

The following describes elements of an embodiment (typical embodiment) of the invention and does not limit the invention.

A drilling fluid adjusting agent of the invention comprises a nonion-modified polyvinyl alcohol containing 1,2-diol having structural unit with the general formula (1) below. Hereinafter, the nonion-modified polyvinyl alcohol is called "side chain 1,2-diol-containing PVA-based resin(A)".

[formula 1]

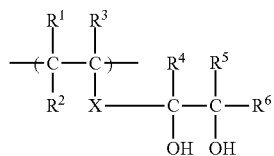
(1)

In the formula (1), $R^1$, $R^2$, and $R^3$ each is independently hydrogen atom or an alkyl group having from 1 to 5 carbon atoms, X is single bond or a binding chain, $R^4$, $R^5$, and $R^6$ each is independently hydrogen atom or an alkyl group having from 1 to 5 carbon atoms.

Examples of the alkyl group having from 1 to 5 carbon atoms include methyl, ethyl, n-propyl, isopropyl, n-butyl, isobutyl, and tert-butyl. The alkyl group may have a substituent such as halogen, hydroxyl, ester, carboxylic acid, or sulfonic acid according to needs. It is preferable that all of $R^1$ through $R^6$ are hydrogen atoms.

Examples of the binding chain include hydrocarbons such as alkylene, alkenylene, alkynylene, phenylene, and naphthylene, which may have a halogen such as fluorine, chlorine, or bromine as a substituent. Also the binding chain include —O—, —$(CH_2O)_m$—, —$(OCH_2)_m$—, —$(CH_2O)_m CH_2$—, —CO—, —COCO—, —$CO(CH_2)_m CO$—, —$CO(C_6H_4)CO$—, —S—, —CS—, —SO—, —$SO_2$—, —NR—, —CONR—, —NRCO—, —CSNR—, —NRCS—, —NRNR—, —$HPO_4$—, —$Si(OR)_2$—, —$OSi(OR)_2$—, —$OSi(OR)_2O$—, —$Ti(OR)_2$—, —$OTi(OR)_2$—, —$OTi(OR)_2O$—, —Al(OR)—, —OAl(OR)—, —OAl(OR)O—, and the like, in which each R is independently a substituent (preferably hydrogen atom or an alkyl group), and m is natural number. The most preferable binding chain is single bond from the viewpoint of thermostability, and structure stability at high temperatures or under acidic conditions.

Accordingly, the most favorable 1,2-diol structural unit with the formula (1) is the structural unit with the formula (1a) in which all of $R^1$ through $R^6$ are hydrogen atoms and X is single bond.

[formula 1a]

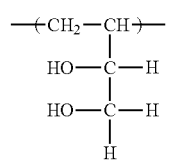
(1a)

A manufacturing method of the side chain 1,2-diol-containing PVA-based resin include, but is not limited to, (i) a method comprising saponifying a copolymer of vinyl ester-based monomer and a compound of the formula (2); (ii) a method comprising saponifying a copolymer of vinyl ester-based monomer and a compound of the formula (3), and decarboxylating; and (iii) a method of saponifying a copolymer of vinyl ester-based monomer and a compound of the formula (4), and deketalizing.

[formula 2]

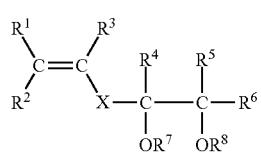
(2)

[formula 3]

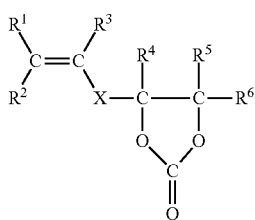

(3)

[formula 4]

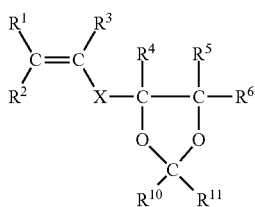

(4)

In the formulas (2), (3), and (4), $R^1$, $R^2$, $R^3$, X, $R^4$, $R^5$, and $R^6$ are identical to those in the formula (1). $R^7$ and $R^8$ each is independently hydrogen atom or $R^9$—CO—, in which $R^9$ is an alkyl group, preferably methyl, ethyl, propyl, butyl, hexyl or octyl, and the alkyl group may contain a substituent such as halogen, ester, carboxylic acid, or sulfonic acid within the range not adversely affecting the reactivity of copolymerization and its successive processes. $R^{10}$ and $R^{11}$ each is independently hydrogen atom or an alkyl group. The alkyl group for $R^{10}$ and $R^{11}$ is an alkyl group having from 1 to 4 carbon atoms such as methyl, ethyl, n-propyl, isopropyl, n-butyl, or tert-butyl, but is not limited thereto. These alkyl groups may have a substituent such as halogen, hydroxyl, ester, carboxylic acid, or sulfonic acid as far as the copolymerization reactivity is not inhibited.

Examples of the compound with the formula (2) include 3,4-dihydroxy-1-butene, 3,4-diacyloxy-1-butene, 3-acyloxy-4-hydroxy-1-butene, 4-acyloxy-3-hydroxy-1-butene, and 3,4-diacyloxy-2-methyl-1-butene, which are compounds each having X of single bond; 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, and 5,6-diacyloxy-1-hexene, which are compounds each having X of an alkylene group; glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, which are compounds each having X of —CH$_2$OCH$_2$— or —OCH$_2$—.

A preferable compound with the formula (3) is vinyl ethylene carbonate, which is the compound having hydrogen atoms for $R^1$, $R^2$, $R^3$, $R^4$, $R^5$, and $R^6$, and having single bond for X, from the viewpoint of availability and copolymerization reactivity.

A preferable compound with the formula (4) is 2,2-dimethyl-4-vinyl-1,3-dioxolane, which is the compound having hydrogen atoms for $R^1$, $R^2$, $R^3$, $R^4$, $R^5$, and $R^6$ and having methyl groups for $R^{10}$ and $R^{11}$, from the viewpoint of availability and copolymerization reactivity.

The methods described in, for example JP2006-95825A, may be employed for the manufacturing method of (i), (ii), and (iii).

The method (i) using 3,4-diacyloxy-1-butene, especially 3,4-diacetoxy-1-butene is preferably used from the viewpoint of copolymerization reactivity and industrial handling ability. 3,4-diacyloxy-1-butene is a compound which has hydrogen atoms for $R^1$ through $R^6$ and has single bond for X, and has $R^7$ and $R^8$ being $R^9$—CO— wherein $R^9$ is an alkyl group. 3,4-diacetoxy-1-butene is in the case that methyl is employed for $R^9$. The method using 3,4-diacetoxy-1-butene produces the identical by-product in saponification of the copolymer using vinyl acetate as a typical vinyl ester-based monomer. Therefore, the manufacturing method using 3,4-diacetoxyl-butene does not need another apparatus for the post-treatment or recovery of solvents or another process, which makes it possible to utilize an existing facility. It is an industrial advantage.

On the other hand, the methods of (ii) and (iii) are afraid that carbonate ring or acetal ring remains in the resultant side chain 1,2-diol-containing PVA-based resin in the case of the production of side chain 1,2-diol-containing PVA-based resin having low saponification degree or in the case that decarboxylation or deacetalization is not performed thoroughly in the production. Such a side chain 1,2-diol-containing PVA-based resin in which carbonate ring or acetal ring still exists is likely to lower the function as a dispersing agent for bentonite. For these reasons, the method (i) is most preferable for the production of side chain 1,2-diol-containing PVA-based resin for drilling fluid adjusting agent.

As a vinyl ester-based monomer copolymerizing with a monomer serving the above-mentioned structural unit of 1,2-diol in a side chain, vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, or vinyl versatate may be used. Vinyl acetate is preferably used from the viewpoint of economics.

The side chain 1,2-diol-containing PVA-based resin contains vinyl alcohol unit with the formula (5) besides the structural unit of 1,2-diol in a side chain with the formula (1).

[formula 5]

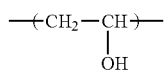

(5)

In the case that the saponification degree is less than 100%, the side chain 1,2-diol-containing PVA-based resin further contains vinyl ester unit with the formula (6), in which $R^{20}$ is an alkyl group having from 1 to 20 carbon atoms, preferably alkyl group having from 1 to 13 carbon atoms, most preferably methyl group.

[formula 6]

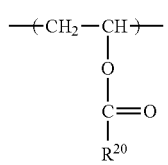

(6)

Besides the above-mentioned monomers (i.e. vinyl ester-based monomer, and a compound with the formula (2), (3), or (4)), another copolymerizable compound may be copolymerized unless the resin physical property is remarkably affected. The another copolymerizable compound include α-olefins such as ethylene and propylene; hydroxy group-containing α-olefins such as 3-buten-1-ol, 4-penten-1-ol, 5-hexene-1,2-diol, or acylated derivative thereof; unsaturated acids such as itaconic acid, maleic acid, acrylic acid or salt thereof, or mono- or di-alkyl ester; nitriles such as acrylonitrile; amides such as methacrylamide and diacetone acrylamide; olefin sulfonic acids such as ethylene sulfonic acid, allyl sulfonic acid, methallyl sulfonic acid, and AMPS or salt thereof.

In the case that the another compound is copolymerized, the side chain 1,2-diol-containing PVA-based resin further contains the structural unit derived from the another compound.

As for the side chain 1,2-diol-containing PVA-based resin having structural units mentioned above, the average polymerization degree may be selected from the range of usually 500 to 4000, preferably 1000 to 3000, more preferably 1000 to 2000. The average polymerization degree is measured according to JIS K6726. Unduly low average polymerization degree tends to lower the reduction effect for hydration swelling of shale clay such as bentonite, and results in lowering collapse resistance of mud wall. Unduly high average polymerization degree tends to lower the productivity of side chain 1,2-diol-containing PVA-based resin.

The side chain 1,2-diol-containing PVA-based resin used in the invention has a saponification degree of usually 80 to 100 mol %, preferably 88 to 99.8 mol %, more preferably 90 to 99.5 mol %, further more preferably 95 to 99.5 mol %, particularly preferably 98 to 99.5 mol %. The saponification degree is measured according to JIS K6726. In general, an unmodified PVA-based resin having almost 100% saponification degree is hard to dissolve in water at normal temperature due to high crystallinity of the unmodified PVA-based resin. While side chain 1,2-diol-containing PVA-based resin having almost 100% saponification degree exhibits excellent solubility in water at normal temperature probably because of disorder in crystal by the unit of 1,2-diol in a side chain. Therefore the side chain 1,2-diol-containing PVA-based resin having a saponification degree as high as deemed improper for unmodified PVA-based resin can be also used. More advantageously, the side chain 1,2-diol-containing PVA-based resin is improved even in brine solubility.

Employment of side chain 1,2-diol-containing PVA-based resin having such high saponification degree has the following advantages. A typical partially saponified PVA is easily saponified under strong acidic or basic condition, however, a highly saponified side chain 1,2-diol-containing PVA-based resin is not further saponified even under strong acidic or basic condition, and therefore providing a drilling fluid with stable properties. In the case of dissolving the highly saponified side chain 1,2-diol-containing PVA-based resin in drilling fluid containing seawater or sufficient amount of salt as an additive, less foam formation is occurred comparing to a typical partially saponified PVA. On the other hand, the side chain 1,2-diol-containing PVA-based resin having unduly low saponification degree tends to be lowered in reducing swelling of layered compound such as montmorillonite.

The side chain 1,2-diol-containing PVA-based resin used in the invention has a content of the structural unit of 1,2-diol in a side chain with the formula (1) selected from the range of usually 0.1 to 20 mol %, preferably 0.5 to 10 mol %, more preferably 1 to 8 mol %. The lower the content is, the closer to an unmodified PVA the side chain 1,2-dial-containing PVA-based resin becomes, as a result, the water-solubility is lowered. On the other hand, the side chain 1,2-diol-containing PVA-based resin having an unduly high content of the unit tends to increase in its production cost.

A drilling fluid adjusting agent of the present invention comprises a side chain 1,2-diol-containing PVA-based resin having the above-mentioned structures. The content of the side chain 1,2-diol-containing PVA-based resin in the drilling fluid adjusting agent is usually from 0.05 to 20 wt %, preferably from 0.1 to 10 wt %, more preferably from 1 to 8 wt %. The content of the side chain 1,2-diol-containing PVA-based resin in the drilling fluid is usually from 0.01 to 10 wt %, preferably from 0.1 to 3 wt %, more preferably from 0.3 to 2 wt %. The content ratio in weight of the side chain 1,2-diol-containing PVA-based resin to clay mineral in drilling fluid, i.e. clay mineral:side chain 1,2-diol-containing PVA-based resin, is usually from 30:1 to 1:1, preferably from 10:1 to 2:1, more preferably from 6:1 to 3:1. If the content of the side chain 1,2-diol-containing PVA-based resin is unduly low, reduction effect of hydration swelling of clay-based mineral tends to be lowered. As a result, the effect by the addition of the side chain 1,2-diol-containing PVA-based resin, which is inhibition of mud wall collapse, is not sufficiently obtained.

According to the present invention, besides the side chain 1,2-diol-containing PVA-based resin, the drilling fluid adjusting agent may contain acid, friction reducer, surfactant, salts, gelling agent, pH adjusting agent, and another water-soluble polymer, if necessary.

Examples of the salts include potassium chloride, sodium chloride, calcium chloride, ammonium salt, phosphate, carbonate, and sulfate. Among them, potassium chloride is preferred. The content of the salt is usually from 0.1 to 30%, preferably from 1 to 20% by weight based on the weight of drilling fluid. Potassium ion can stabilize mudstone layer and assist transportation of drilling cuttings, however, the drilling fluid having unduly high content of potassium ion becomes difficult to control fluidity due to its high cohesive force. On the other hand, the side chain 1,2-diol-containing PVA-based resin can thoroughly dissolve in metal (including potassium) salt aqueous solution, and can still maintain expected dispersing property even in the presence of salts. Accordingly, the drilling fluid adjusting agent of the invention will disperse bentonite thoroughly, and make potassium ion possible to perform its function of swelling reduction of montmorillonite.

Other water-soluble polymer such as carboxymethyl cellulose, starch, polyacrylic acid or its salt, and polyacrylamide may be contained in the drilling fluid adjusting agent within the range not inhibiting the effect of the invention.

Also, a conventional dispersing agent for a drilling fluid may be used with the drilling fluid adjusting agent of the invention within the range not inhibiting the effect of the invention. Examples of the conventional dispersing agent include barite, humic acid-based dispersing agent, lignin-based dispersing agent, water-loss inhibitor, mud oil, and antifoamer. The conventional dispersing agent may be used within the range of not inhibiting the effect of the invention, preferably in the same or less amount comparing to the amount of the drilling fluid adjusting agent of the invention.

[Drilling Fluid]

A drilling fluid of the invention comprises a drilling fluid adjusting agent of the invention, and drilling mud water or oil. The respective drilling mud water or oil contains inorganic clay mineral in water or oil as a liquid medium. The water is not limited but includes underground water and seawater. When the water contains a salt at a high content, the final salt content should be appropriately adjusted by regulating the composition of the drilling fluid adjusting agent.

The content of the drilling fluid adjusting agent is usually from 0.01 to 5%, preferably from 0.1 to 3%, particularly preferably from 0.5 to 2% by weight, based on the weight of the drilling fluid.

A conventionally known inorganic clay mineral is used as an inorganic clay mineral. Examples of the inorganic clay include montmorillonite, quartz, cristobalite, feldspars, bentonite-based compound, beidellite, nontronite, saponite, hectorite, sauconite, and smectite such as stevensite-based compound. Among them, bentonite-based compound is preferably used. The inorganic clay mineral is used in concentration of usually from 0.05 to 20%, preferably from 0.1 to 10% by weight based on the drilling fluid.

Inorganic clay-based mineral such as bentonite is contained in drilling fluid by not only the addition as a viscosity adjuster but also being transported with drilling cuttings in drilling operation. However, extra bentonite transported from bottom hole during circulation of drilling fluid is usually filtrated, thereby maintaining the constant content of inorganic clay-based mineral such as bentonite.

A drilling mud containing drilling fluid adjusting agent of the invention may be used in drilling operation at a temperature of 200° C. or less, preferably 180° C. or less. If the temperature exceeds 200° C., the side chain 1,2-diol-containing PVA-based resin may be decomposed due to such high temperature. In addition, the viscosity of the drilling fluid may become so low that swelled drilling cuttings cannot be transported enough to be filtrated on the ground.

The drilling fluid containing a drilling fluid adjusting agent may be used for a general civil engineering work including drilling operations. The drilling fluid may be also used in drilling operation in great depth, especially drilling for oil. This is because the drilling fluid adjusting agent exhibits solubility enough to act as a dispersing agent for bentonite, even in the presence of salts, particularly in bentonite mud containing salts. Furthermore, the drilling fluid may be used for drilling the earth which seawater may permeate. The drilling fluid of the invention may employ seawater as a part or entire liquid medium.

EXAMPLE

The present invention will be specifically described based on examples. The invention is not limited to the examples as long as it does not exceed the gist thereof. The terms "parts" and "%" are on the basis of weight unless otherwise indicated.

[Measurement and Evaluation Methods]
(1) Swelling Rate

One part of PVA-based resin was dissolved in 99 parts of water to prepare 1 wt % PVA aqueous solution.

Three montmorillonite pellets (San Salvo) having a length of 10-25 mm, width of 10-15 mm, and thickness of 10-15 mm were evenly put in a transparent container set on a grid sheet with 90 mm in diameter and 20 mm in height.

The above prepared PVA aqueous solution was flown gently into the container so that the PVA aqueous solution was over the montmorillonite pellets. The pellets were kept immersed in the PVA aqueous solution for 4 hours.

The original length $L_0$ (mm) of the respective pellet and the length $L_4$ (mm) of the respective pellet after 4 hours immersion were measured by reading out the scale of the grid sheet. The pellet swelling rate (%) was calculated using the $L_0$ and $L_4$ based on the formula below. The average value of the swelling rates of 3 pellets was employed.

Swelling rate (%)=$(L_4/L_0)\times 100$ (2) Water Solubility

About 4 g ($S_1$g) of dried PVA-based resin pellets were dispersed in 200 ml deionized water in conical flask, and stirred at 20° C. for 30 minutes to dissolve in the water. Thus obtained PVA dispersion was filtrated with a metallic mesh having a thickness of 35 μm and a weight of $A_1$g. The conical flask in which undissolved PVA was present was cleansed with 400 ml water having 20° C., and the resultant PVA dispersion obtained after cleansing was transferred to the metallic mesh. Thus separated PVA on the metallic mesh was dried for 2 hours in electric oven dryer kept at 105° C. The weight of the dried metallic mesh to which the separated PVA attached was measured as $B_1$g. The undissolved PVA rate was calculated by the following formula. Water solubility (%) is determined by deducting the calculated undissolved PVA rate from 100%.

Undissolved PVA rate (%)=$[(B_1-A_1)/S_1]\times 100$ (3) Brine Solubility

About 4 g ($S_2$g) of dried PVA-based resin particles were dispersed in 200 ml of 4% potassium chloride aqueous solution in a conical flask, and stirred at 20° C. for 30 minutes to dissolve in the potassium chloride aqueous solution. Thus obtained PVA dispersion was filtrated with a metallic mesh having a thickness of 35 μm and a weight of $A_2$ g. The conical flask in which undissolved PVA was present was cleansed with 400 ml water having 20° C., and the PVA dispersion obtained after cleansing was transferred to the metallic mesh. Thus separated PVA on the metallic mesh was dried for 2 hours in electric oven dryer kept at 105° C. The weight of the dried metallic mesh to which the PVA attached was measured as $B_2$ g. The undissolved PVA rate was calculated by the following formula. Brine solubility (%) is determined by deducting the obtained undissolved content rate from 100%.

Undissolved content rate (%)=$[(B_2-A_2)/S_2]\times 100$ (4) Saponification Degree It was calculated based on the alkali consumption for hydrolysis of the remaining vinyl acetate and the remaining 3,4-diacetoxy-1-butene.

(5) Average Polymerization Degree

It was measured according to JIS K6726.

(6) Content of the Unit of 1,2-Diol in a Side Chain

It was calculated based on $^1$H-NMR (internal standard: tetramethyl silane, solvent:DMSO-d6).

(7) Content of Oxyalkylene Group

It was calculated based on the supplied amount of monomer serving oxyalkylene.

Example 1: Production and Evaluation of Side Chain 1,2-diol-Containing PVA-Based Resin 1

Into a reaction vessel with reflux condenser, dropping funnel, and stirrer, 3500 parts of vinyl acetate, 520 parts of methanol, and 405 parts of 3,4-diacetoxy-1-butene were thrown, further 0.0320 mol % acetylperoxide (based on vinyl acetate) was thrown. The reaction vessel was heated under nitrogen flow with stirring, thereby initiating polymerization reaction. At the time that the rate of polymerization of vinyl acetate reached 72.5%, the polymerization reaction was stopped by adding methoxy phenol 100 ppm (based on vinyl acetate) as a polymerization inhibitor. Subsequently unreacted vinyl acetate monomer was removed by flowing gaseous methanol into the reaction vessel to obtain the copolymer methanol solution.

Next, the obtained copolymer solution was diluted with methanol up to the concentration of 30% and then was charged in a kneader. 2% methanol solution of sodium hydroxide was added to the copolymer solution at the amount of 12.6 mmol per 1 mol of the total amount of vinyl acetate and 3,4-diacetoxy-1-butene with keeping at 40° C. to saponify the copolymer. Thus saponified product was precipitated with undergoing the saponification. When the precipitation became particles, the particles were filtrated, rinsed with methanol and dried in hot air dryer to obtain side chain 1,2-diol-containing PVA-based resin 1.

The side chain 1,2-diol-containing PVA-based resin 1 was measured and evaluated based on the above-mentioned method with respect to average polymerization degree, saponification degree, content of the unit of 1,2-diol in a side chain, swelling reduction, water solubility, and brine solubility. The results are shown in Table 1.

Example 2: Production and Evaluation of Side Chain 1,2-diol-Containing PVA-Based Resin 2

Into a reaction vessel with reflux condenser, dropping funnel, and stirrer, 6500 parts of vinyl acetate, 260 parts of methanol, and 268 parts of 3,4-diacetoxy-1-butene were thrown, further 0.0033 mol % acetylperoxide (based on vinyl acetate) was thrown. The reaction vessel was heated under nitrogen flow with stirring, thereby initiating polymerization reaction. At the time that the rate of polymerization of vinyl acetate reached. 52%, the polymerization reaction was stopped by adding methoxy phenol 30 ppm (based on vinyl acetate) a polymerization inhibitor. Subsequently unreacted vinyl acetate monomer was removed by flowing gaseous methanol into the reaction vessel to obtain the copolymer methanol solution.

Next, the obtained copolymer solution was diluted with methanol up to the concentration of 30% and then was charged in a kneader. 2% methanol solution of sodium hydroxide was added to the copolymer solution at the amount of 13 mmol per 1 mol of the total amount of vinyl acetate and 3,4-diacetoxy-1-butene with keeping at 40° C. to saponify the copolymer. Thus saponified product was precipitated with undergoing the saponification. When the precipitation became particles, the particles were filtrated, rinsed with methanol and dried in hot air dryer to obtain side chain 1,2-diol-containing PVA-based resin 2.

The side chain 1,2-diol-containing PVA-based resin 2 was measured and evaluated based on the above-mentioned method with respect to average polymerization degree, saponification degree, content of the unit of 1,2-diol in a side chain, swelling reduction, water solubility, and brine solubility. The results are shown in Table 1.

Example 3: Production and Evaluation of Side Chain 1,2-diol-Containing PVA-Based Resin 3

Into a reaction vessel with reflux condenser, dropping funnel, and stirrer, 350 parts of vinyl acetate, 12 parts of methanol, and 51 parts of 3,4-diacetoxy-1-butene were thrown, further 0.002 mol % acetylperoxide (based on vinyl acetate) was thrown. The reaction vessel was heated under nitrogen flow with stirring, thereby initiating polymerization reaction. At the time that the rate of polymerization of vinyl acetate reached 65%, the polymerization reaction was stopped by adding methoxy phenol 100 ppm (based on vinyl acetate) as a polymerization inhibitor. Subsequently unreacted vinyl acetate monomer was removed by flowing gaseous methanol into the reaction vessel to obtain the copolymer methanol solution.

Next, the copolymer solution was diluted with methanol up to the concentration of 35% and then was charged in a kneader. 2% methanol solution of sodium hydroxide was added to the copolymer solution at the amount of 9 mmol per 1 mol of the total amount of vinyl acetate and 3,4-diacetoxy-1-butene to saponify the copolymer with keeping at 35° C. Thus saponified product was precipitated with undergoing the saponification. When the precipitation became particles, the particles were filtrated, rinsed with methanol and dried in hot air dryer to obtain side chain 1,2-diol-containing EVA-based resin 3.

The side chain 1,2-diol-containing PVA-based resin 3 was measured and evaluated based on the above-mentioned method with respect to average polymerization degree, saponification degree, content of the unit of 1,2-diol in a side chain, swelling reduction, water solubility, and brine solubility. The results are shown in Table 1.

Comparative Example 1: Production and Evaluation of oxyalkylene-Modified EVA 1

A polymerization reaction vessel in which 15.0 parts polyoxyethylene monoallyl ether having average chain length (n) of ten oxyethylene groups, 85 parts of vinyl acetate, and 10.0 parts of methanol were contained was heated up to start refluxing. After refluxing for 30 minutes, azobissobutyronitrile 0.08 mol % (per the total amount of the vinyl acetate) was supplied in the reaction vessel to initiate polymerization. 0.08 mol % (per the total amount of the vinyl acetate) of azobisisobutyronitrile was added respective 2 hours and 4 hours after the initiation of the polymerization reaction.

At the time of about 8 hours after the polymerization reaction started, 20 parts of methanol as a coolant and 0.2 parts of m-dinitrobenzene as an inhibitor were supplied to cool the reaction vessel jacket, thereby terminating the polymerization reaction to obtain polyoxyethylene group-containing vinyl acetate polymer. The rate of polymerization of the obtained polymer was about 95%.

Subsequently, residue monomers were removed from the resulting solution of oxyethylene group-containing polyvinyl acetate. After then, the solution was diluted with methanol to adjust the concentration of oxyethylene group-containing polyvinyl acetate to 49%. The oxyethylene group-containing polyvinyl acetate solution with an adjusted concentration was charged in a kneader. 2% methanol solution of sodium hydroxide was added to the kneader at an amount of 11 mmol to 1 mol of vinyl acetate unit of the oxyethylene group-containing polyvinyl acetate to saponify the oxyethylene group-containing polyvinyl acetate with keeping at 40° C. Thus saponified product was separated out with proceeding the saponification, and finally the saponified product became particles. The particles were filtrated, washed well with methanol, and dried in hot air dryer, thereby obtaining oxyalkylene-modified PVA 1.

The oxyalkylene-modified PVA 1 was measured and evaluated according to the above-mentioned method with respect to saponification degree, average polymerization degree, content of oxyalkylene group, swelling reduction, water solubility, and brine solubility. The results are shown in Table 1.

Comparative Example 2: Production and Evaluation of oxyalkylene-Modified PVA 2

A polymerization reaction vessel in which 15.0 parts polyoxyethylene monoallyl ether having average chain length (n) of ten oxyethylene groups, 85 parts of vinyl acetate, and 10.0 parts of methanol were contained was heated up to start refluxing. After refluxing for 30 minutes, azobisisobutyronitrile 0.08 mol % (per the total amount of the vinyl acetate) was supplied in the reaction vessel to initiate polymerization. 0.08 mol % (per the total amount of the vinyl acetate) of azobisisobutyronitrile was added respective 2 hours and 4 hours after the initiation of the polymerization reaction.

About 8 hours after the initiation of the polymerization reaction, 20 parts of methanol as a coolant and 0.2 parts of m-dinitrobenzene as an inhibitor were supplied to cool the reaction vessel jacket, thereby terminating the polymerization reaction to obtain polyoxyethylene group-containing vinyl acetate polymer. The rate of polymerization of the polymer was about 95%.

Subsequently, residue monomers were removed from the resulting solution of oxyethylene group-containing polyvinyl acetate. After then, the solution was diluted with methanol to adjust the concentration of oxyethylene group-containing polyvinyl acetate to 40%. The oxyethylene group-containing polyvinyl acetate solution with an adjusted concentration was charged in a kneader. 2% methanol solution of sodium hydroxide was added in an amount of 11 mmol to 1 mol of vinyl acetate unit of the oxyethylene group-containing polyvinyl acetate to saponify the oxyethylene group-containing polyvinyl acetate with keeping at 40° C. Thus saponified product was separated out with proceeding the saponification, and finally the saponified product became particles. Thus obtained resin particles were filtrated, washed well with methanol, and dried in hot air dryer, thereby obtaining oxyalkylene-modified PVA 2.

The oxyalkylene-modified PVA 2 was measured and evaluated according to the above-mentioned method with respect to saponification degree, average polymerization degree, content of oxyalkylene group, swelling reduction, water solubility, and brine solubility. The results are shown in Table 1.

Comparative Example 3: Unmodified PVA

An unmodified PVA having saponification degree of 88 mol % and polymerization degree of 2100 was employed for Comparative example 3. Swelling reduction, water solubility, and brine solubility of the unmodified PVA were measured and evaluated. The results are shown in Table 1.

TABLE 1

| | PVA | | | | | Evaluation | |
| --- | --- | --- | --- | --- | --- | --- | --- |
| | Modification | Modification rate (mol %) | Polymerization degree | Saponification degree (mol %) | Swelling rate (%) | Water solubility (%) | Brine solubility (%) |
| Example 1 | Side chain 1,2-diol | 6 | 1200 | 99.1 | 122 | 99 | 98 |
| Example 2 | Side chain 1,2-diol | 3 | 2000 | 98.8 | 121 | 97 | 96 |
| Example 3 | Side chain 1,2-diol | 8 | 1200 | 98.5 | 123 | 99 | 98 |
| Comparative Example 1 | oxyalkylene | 2 | 750 | 86.6 | 138 | 100 | 100 |
| Comparative Example 2 | oxyalkylene | 2 | 750 | 99.2 | 120 | 78 | 0 |
| Comparative Example 3 | unmodification | — | 2100 | 88 | 124 | 91 | 80 |

In the case of oxyalkylene-modified PVA, the PVA having a high saponification degree around 99 mol %, i.e. Comparative Example 2, exhibited not only lowered water solubility but also no brine solubility. Oxyalkylene-modified PVA having a saponification degree as low as around 88 mol % exhibited a satisfactory water solubility and brine solubility, but increased hydration swelling rate (Comparative Example 1).

In the case of unmodified PVA, a partially saponified PVA having saponification degree around 88 mol %, i.e. Comparative Example 3, did not impair swelling reduction, but had insufficient brine solubility of about 80%.

On the other hand, in the case of side chain 1,2-diol-containing PVA-based resin, the PVAs each having saponification degree as high as 98 mol % exhibited high water solubility and brine solubility. As shown in Examples 1, 2, and 3, both of water solubility and brine solubility were 96% or more. In addition, swelling reduction of these examples 1, 2, and 3 were not impaired.

INDUSTRIAL APPLICABILITY

A drilling fluid adjusting agent of the invention is excellent in water solubility and brine solubility at normal temperature as well as excellent in reducing swelling of bentonite. Accordingly, a drilling fluid containing the drilling fluid adjusting agent of the invention is preferably used as a drilling fluid used in drilling deep holes, in particular, a drilling fluid used in drilling for oil, used as drilling fluid containing sufficient potassium salt, or used in offshore drilling work where drilling fluid is easily contaminated by seawater.

The invention claimed is:
1. A drilling fluid adjusting agent comprising
   (A) polyvinyl alcohol-based resin containing 1,2-diol structural unit represented by the general formulas (1), (5) and (6),

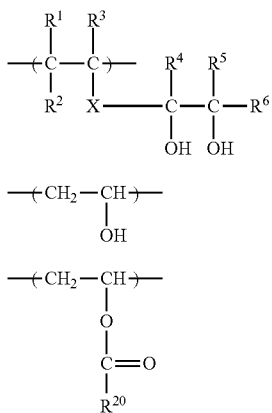

wherein, $R^1$ through $R^3$ each is independently hydrogen atom or an alkyl group having from 1 to 5 carbon atoms, X is single bond or a binding chain, and $R^4$ through $R^6$ each is independently hydrogen atom or an alkyl group having from 1 to 5 carbon atoms, $R^{20}$ is an alkyl group having from 1 to 20 carbon atoms.

2. The drilling fluid adjusting agent according to claim 1, wherein the polyvinyl alcohol-based resin (A) has an average polymerization degree of 500 to 4000.

3. The drilling fluid adjusting agent according to claim 1, wherein the content of the 1,2-diol structural unit with the formula (1) is from 0.1 to 20 mol %.

4. The drilling fluid adjusting agent according to claim 1, further comprising a salt.

5. A drilling fluid comprising a liquid medium, bentonite, and a drilling fluid adjusting agent according to claim 1.

6. The drilling fluid according to claim 5, wherein the liquid medium is a water-based medium.

7. The drilling fluid according to claim 5, wherein the content of the drilling fluid adjusting agent is from 0.01 to 5%.

8. The drilling fluid adjusting agent according to claim 1, wherein the polyvinyl alcohol-based resin (A) has a saponification degree of 80 to 99.8 mol %.

9. The drilling fluid adjusting agent according to claim 8, wherein the polyvinyl alcohol-based resin (A) has a saponification degree of 88 to 99.8 mol %.

* * * * *